(12) United States Patent
Zirkelbach

(10) Patent No.: US 8,763,250 B2
(45) Date of Patent: Jul. 1, 2014

(54) METHOD AND DEVICE FOR PRODUCING A PIPE

(75) Inventor: Thomas Zirkelbach, Tamm (DE)

(73) Assignee: Mahle International GmbH (DE)

( * ) Notice: Subject to any disclaimer, the term of this patent is extended or adjusted under 35 U.S.C. 154(b) by 1413 days.

(21) Appl. No.: 12/519,617

(22) PCT Filed: Dec. 13, 2007

(86) PCT No.: PCT/EP2007/063860
§ 371 (c)(1),
(2), (4) Date: Feb. 2, 2010

(87) PCT Pub. No.: WO2008/074720
PCT Pub. Date: Jun. 26, 2008

(65) Prior Publication Data
US 2010/0132649 A1 Jun. 3, 2010

(30) Foreign Application Priority Data
Dec. 18, 2006 (DE) .......................... 10 2006 060 144

(51) Int. Cl.
*B21D 51/16* (2006.01)

(52) U.S. Cl.
USPC .............. 29/890.08; 123/184.53; 29/890.052; 264/573

(58) Field of Classification Search
CPC ......... B21C 37/14; B21D 53/00; F16L 47/32; F16L 55/033; B29C 2049/4807; B29C 2049/4812; B29C 2791/001; B29C 2793/009; B29C 49/4802; B29C 49/50
USPC ............. 123/184.53, 184.46, 184.57, 184.21, 123/184.23; 29/890.08, 890.052, 890.053; 264/167, 534, 529, 155, 156, 540; 425/522, 133.1, 192 R, 378.1
See application file for complete search history.

(56) References Cited

U.S. PATENT DOCUMENTS 2,890,483 A * 6/1959 Soubier .......................... 425/527
3,105,296 A * 10/1963 Brick et al. ................... 29/527.3
(Continued)

FOREIGN PATENT DOCUMENTS

DE 1968384 9/1967
(Continued)

OTHER PUBLICATIONS

English abstract for DE-3219669.
(Continued)

*Primary Examiner* — Noah Kamen
*Assistant Examiner* — Long T Tran
(74) *Attorney, Agent, or Firm* — Rader, Fishman & Grauer PLLC

(57) ABSTRACT

The present invention relates to a method for producing a pipe (1) which is provided in its wall (2) and between its ends with at least one channel (4) which passes through the wall (2), in which method a plastic pipe preform (16) is blow-moulded, wherein a protrusion (17) is provided for the channel (4), this protrusion lining the pipe preform (16) and having inside dimensions which are larger than the outside dimensions of the channel (4), in which method the pipe preform (16) in its as yet unsolidified state is squashed in the region of the protrusion (17) in such a way that a rough channel (21) communicating with the interior (3) of the pipe (1) is formed for the channel (4), this rough channel being closed at its end remote from the interior (3) of the pipe and having, apart from the desired channel length (7), the outside dimension of the channel (4), and in which method the squashed pipe preform (16) in its solidified state is cut in the region of the rough channel (21) in such a way that the channel (4) is then open and has the desired channel length (7).

13 Claims, 3 Drawing Sheets

(56) References Cited

U.S. PATENT DOCUMENTS

Figure 1:
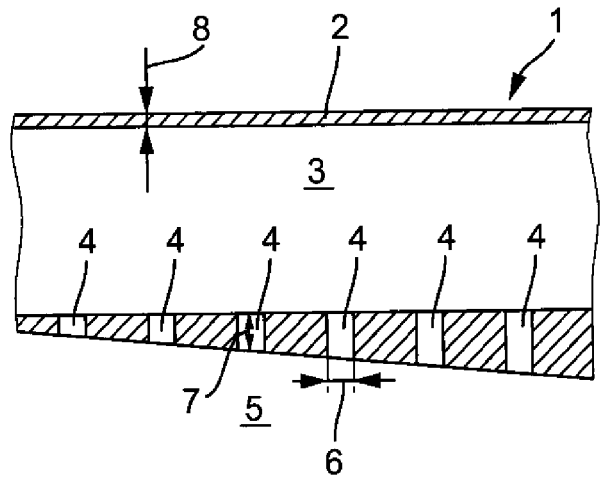

| | | | |
|---|---|---|---|
| 3,300,556 A | 1/1967 | Etal | |
| 3,363,282 A * | 1/1968 | Hagen | 425/216 |
| 3,907,002 A | 9/1975 | Gulich | |
| 5,932,166 A | 8/1999 | Bousselin et al. | |
| 6,372,168 B1 | 4/2002 | Jarvenkyla | |
| 2002/0146481 A1 | 10/2002 | Wust | |
| 2002/0148116 A1* | 10/2002 | Rhodes | 29/890.043 |
| 2003/0066638 A1* | 4/2003 | Qu et al. | 165/186 |
| 2004/0074554 A1* | 4/2004 | Starita | 138/137 |
| 2006/0180958 A1* | 8/2006 | McClung | 264/523 |

FOREIGN PATENT DOCUMENTS

| | | |
|---|---|---|
| DE | 1454947 | 3/1971 |
| DE | 2217252 | 10/1973 |
| DE | 3219699 | 7/1984 |
| DE | 3508320 | 6/1986 |
| DE | 19609963 | 9/1997 |
| DE | 19814772 | 10/1999 |
| DE | 19821836 | 11/1999 |
| DE | 19851076 | 5/2000 |
| DE | 19961455 | 6/2000 |
| DE | 69611865 | 9/2001 |
| DE | 10214900 | 4/2004 |
| DE | 69730069 | 8/2005 |
| EP | 1216812 | 12/2001 |
| EP | 1693240 | 2/2006 |
| JP | 59118435 | 7/1984 |
| JP | 59152822 | 8/1984 |
| JP | 61029524 | 2/1986 |
| JP | 2939905 | 6/1999 |
| JP | 2003103647 | 4/2003 |
| WO | WO-9323666 | 11/1993 |
| WO | WO-03106142 A1 | 12/2003 |

OTHER PUBLICATIONS

English abstract for DE-10214900.
English abstract for DE-19609963.
English abstract for DE-19851076.
English abstract for DE-19814772.
English abstract for DE-19821836.
English abstract for JP-59118435.
English abstract for JP-5915822.
English abstract for JP-61029524.
English abstract for JP-2003103647.
English abstract for JP-2939905.

* cited by examiner

METHOD AND DEVICE FOR PRODUCING A PIPE

CROSS-REFERENCES TO RELATED APPLICATION

This application is a National Stage application which claims the benefit of International Application No. PCT/EP2007/063860 filed Dec. 13, 2007, which claims priority based on German Patent Application No. 102006060144.0, filed Dec. 18, 2006, both of which are hereby incorporated by reference in their entirety.

The present invention relates to a method as well as an apparatus for producing a pipe, the walls between the ends of which have at least one channel that passes through said wall. The invention moreover relates to such a pipe.

Document DE 34 31 078 A1 teaches of a device for silencing the intake noise of an internal combustion engine, which device is arranged in a fresh gas system for supplying the internal combustion engine with fresh gas. To achieve a silencing effect, pipes can be used that have in their wall between their longitudinal ends one or a plurality of channels or through-openings that pass through said wall. It is desirable in the mass production of such pipes to produce the pipes as economically as possible. A subsequent installation of the through-openings or the channels is extremely costly. Even the realisation of an injection-moulding process in which the at least one channel is already prepared in an injection moulding tool is comparably expensive. In contrast thereto, blow-moulding methods can accomplish the same relatively economically. However, blow-moulding methods permit the production of only those types of workpieces that have a circumferentially closed contour since during blow moulding, the tube blank is blown up, that is to say its interior is impinged upon with high pressure. The production of work pieces with circumferential discontinuities, such as through-openings and channels, for example, therefore cannot be achieved with a conventional blow moulding method.

The present invention addresses the problem of providing possibilities for the economical production of the pipes of the aforementioned type.

According to the invention, this problem is solved by the subject matter of the independent claims. Advantageous embodiments are the subject matter of the independent claims.

The invention is based on the general idea of using a blow-moulding process for the production of such a pipe, and thereafter to employ a crush-moulding process that is carried out with a not yet solidified blow-moulded body and preferably with blow-moulded pressure still present. Furthermore, a cutting process is subsequent to the crush-moulding process, which cutting process is carried out on the solidified blow-moulded body. The proposed manner of proceeding is thus based on the comparably economical blow-moulding process and makes it possible to produce the pipe provided with channels in an economical manner. At the same time, the interior of the pipe has a high quality surface that makes the use of the pipe favourable if low flow resistance arises.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

Preferred embodiments of the invention are shown in the drawings and are described in more detail in the following description, the same reference numerals referring to components which are the same or functionally the same or similar.

Figure 2:
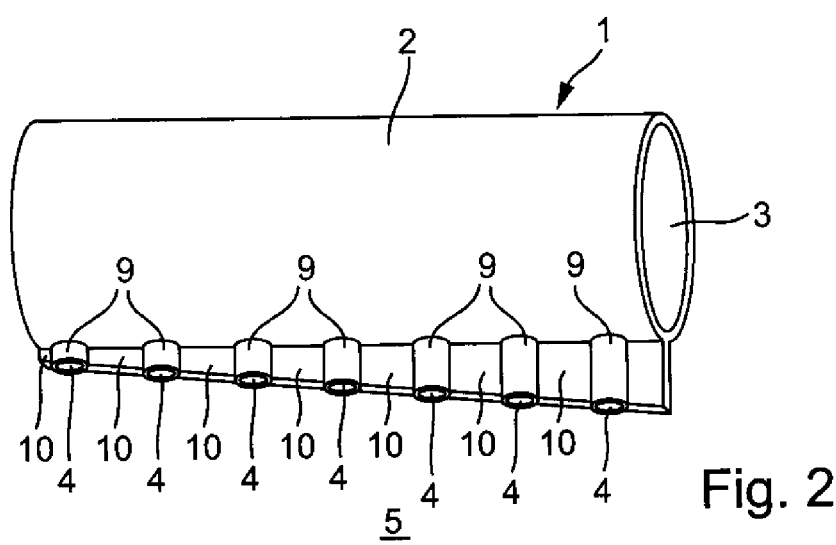
Figure 3:
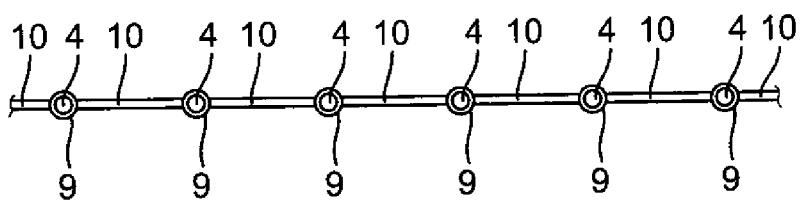
Figure 4:
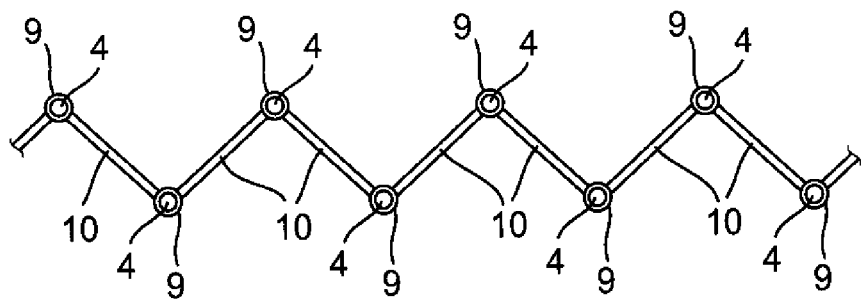
Figure 5:
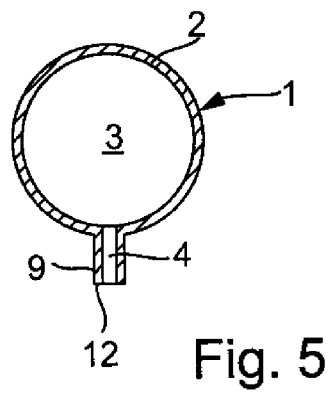
Figure 6:
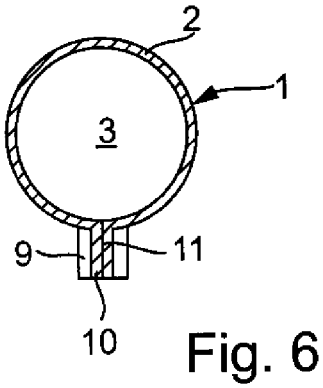
Figure 7:
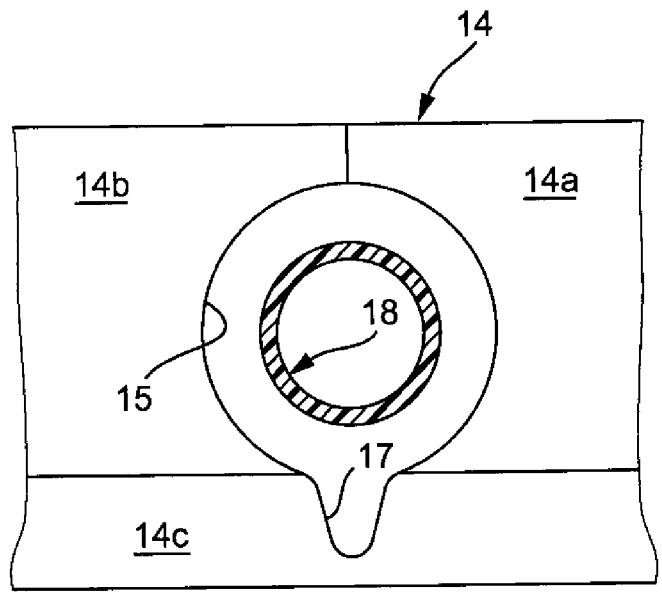
Figure 8:
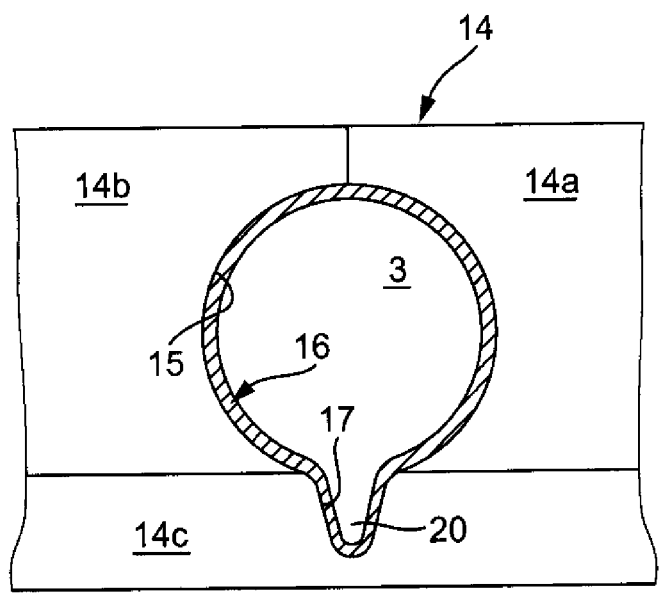
Figure 9:
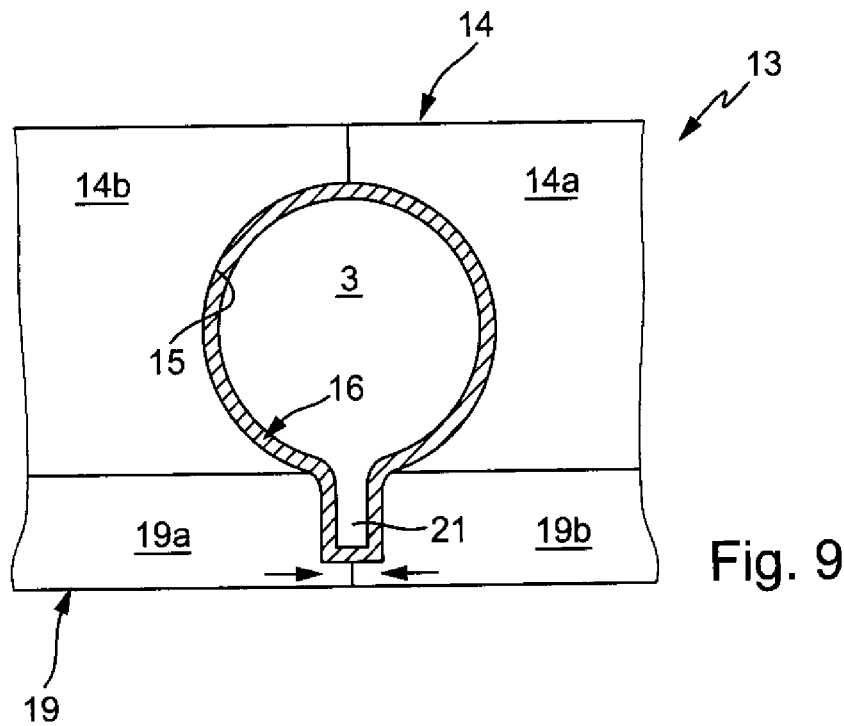
Figure 10:
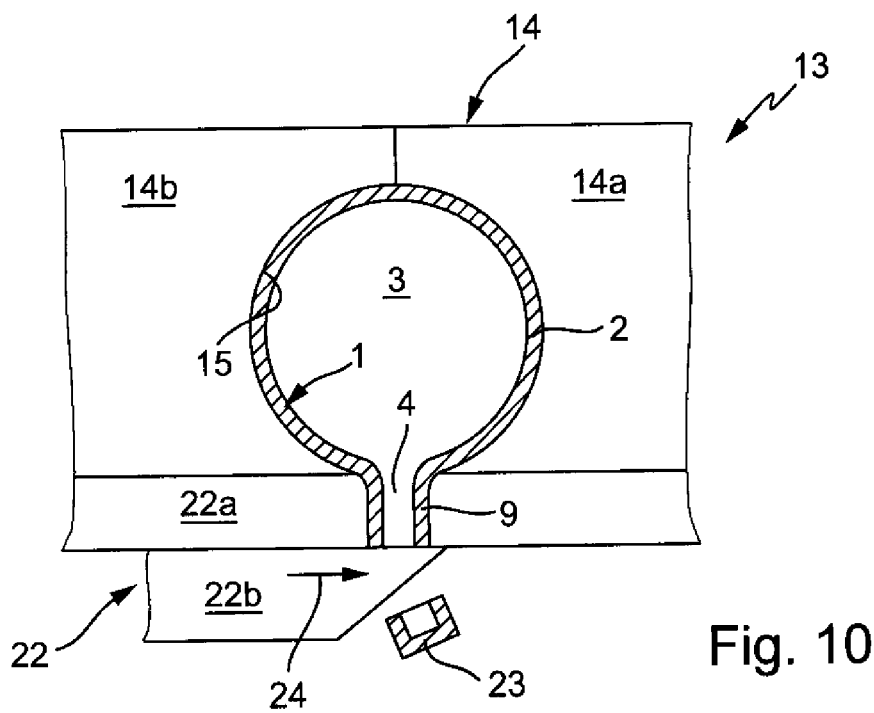

FIG. 1 schematically shows a longitudinal cut through a pipe,

FIG. 2 schematically shows a lateral view of the pipe, however of a different embodiment, FIG. 3 schematically shows an additional lateral view of the pipe in the region of at least one channel, FIG. 4 schematically shows a view as in FIG. 3, however of another embodiment, FIG. 5 schematically shows a cross section through the pipe in the region of at least one channel, FIG. 6 schematically shows a cross section through the pipe in a region outside of at least one channel, FIG. 7 schematically shows a cross section of an apparatus for producing the pipe prior to a blow-moulding process, FIG. 8 schematically shows a view as in FIG. 7, however subsequent to the blow-moulding process, FIG. 9 schematically shows a view as in FIG. 8, however subsequent to a crush-moulding process, FIG. 10 schematically shows a view as in FIG. 9, however subsequent to a cutting process.

Corresponding to FIGS. 1 to 6, a pipe 1 has a wall 2 that circumferentially encases an interior 3 of the pipe 1. The wall 2 between two longitudinal ends, which are not shown, of the pipe 1 has at least one channel 4 that passes through the wall 2 and thus connects the interior 3 of the pipe 1 with an exterior 5 or with a periphery 5 of the pipe 1. In the example, the pipe 1 has a plurality of such channels 4. The individual channels 4 can be identical or may differ from one another with regard to their widths 6 and/or with regard to their length 7. In an extreme case, the channel length 7 corresponds to a wall thickness 8 of the wall 2. In this extreme case, the individual channel 4 is formed through a through-opening in the wall 2.

Contingent upon the production method described in greater detail below, the individual channels 4, which extend preferably radially or obliquely to the longitudinal direction of the pipe 1, are enclosed by cylindrical sleeve bodies 9. Adjacent sleeve bodies 9 are each connected by a web 10. The pipe 1 is blow moulded in such a manner that it, including the sleeve bodies 9 and including the webs 10, is manufactured from a single piece. The channels 4 are preferably arranged one after the other in the longitudinal direction of the pipe 1. In this manner, it is possible, as according to FIG. 3, to arrange the individual channels substantially linearly one after the other or substantially in zigzag formation one after the other, as in FIG. 4.

FIG. 5 shows a cross section of the pipe 1 in the region of a channel 4. In contrast thereto, the pipe 1 in FIG. 6 is shown in the region of a web 10, that is to say cut between two channels 4 that are positioned one after the other. A boundary line designated as 11 indicates a region in which originally separated wall sections were pressed or crushed together during the production of the pipe 1, which is explained in greater detail below. This crush region can be detected in the completed pipe 1 within the context of corresponding structural examinations. Furthermore, an edge of a cut 12 is formed on the interior 3 of the remote channel end, which edge can be detected in the completed pipe 1 within the context of corresponding structural examinations. The pipe 1 is produced from plastic by means of blow moulding. The blow moulding of the pipe 1, the crushing and cutting of the pipe 1 in the region of the channel 4 can be detected in the completed pipe 1 by way of corresponding examinations.

The following explains in greater detail a preferred method for producing the pipe 1 in reference to FIGS. 7 to 10.

The production method is fundamentally based on a blow-moulding process. An apparatus 13 for producing the pipe 1 correspondingly has a blow-moulding tool 14 that comprises, for example, three parts 14a, 14b, 14c. The blow-moulding tool 14 contains a mould cavity 15 that has a shape that is complementary to a tube blank 16 or tube green body 16 or pipe preform 16. For each channel 4 formed on the completed pipe, the mould cavity 15 has a convexity 17. Such a convexity 17 can be provided for each individual channel 4. However, it is preferable that a common convexity 17 be provided for all channels 4. In each instance, each convexity 17 has interior measurements that are greater than the complementary exterior measurements of each completed channel 4 of each completed pipe 1. For example, the extension of the convexity 17 in the radial direction is greater than that of the corresponding channel 4. Moreover, the interior of the convexity 17 can have a broader width than that of the exterior of the corresponding channel 4, that is to say of said channel 4 in its sleeve body 9.

Corresponding to FIG. 7, a tubular plastic body 18 is positioned in the blow-moulding tool or in its convexity 15, which plastic body 18 is not in a solidified state but rather in a viscous state for the blow-moulding process. Upon blowing up the body 18, it expands and, along with its wall, takes its bearing on the surface of the mould cavity 15, the wall thickness of the body 18 being correspondingly reduced.

FIG. 8 shows the already blow-moulded tube blank 16. The tube blank 16 recognisably completely lines the mould cavity 15, and particularly the convexity 17 is thus also lined by the tube blank 16. A predetermined blow-moulding pressure prevails in the interior 3 of the body 18 or in the tube blank 16 for the blow-moulding procedure.

A crushing process follows the blow-moulding process. For this purpose, the apparatus 13, corresponding with FIG. 9, is equipped with a crush-moulding tool 19 that consists, for example, of components 19a and 19b. In the example, the crush-moulding tool 19 replaces the third part 14c of the blow-moulding tool 14. The crush moulding can thus be effected either completely or substantially inside the blow-moulding tool 14. It is possible, in particular, to integrate the crush-moulding tool 19 in the blow-moulding tool 14. Alternatively, the tube blank 16 can be removed from the blow-moulding tool 14 subsequent to the blow moulding and be placed in a separate crush-moulding tool 19.

It can be advisable to design the crush-moulding tool 19 integrated in the blow-moulding tool 14 in such a manner that said crush-moulding tool 19 is adjustable between two positions. The crush-moulding tool 19 is conveyed into a first position for the blow-moulding process, in which position it cannot prevent said blow-moulding process. In this first position, the crush-moulding tool 19 could form the appropriate convexity 17 or at least a region thereof, for example. For the crush-moulding process, the crush-moulding tool 19 is then conveyable into a second position that then effects the crush moulding itself.

During crush moulding, the tube blank 16 is crushed in the region of the channels 4 to be formed, that is to say in the region of the convexity 17. The direction of crushing is indicated in FIG. 9 by two arrows directed toward one another. The crush moulding forms the external measurements of each channel 4, aside from the individual channel lengths. Recesses 20, which formed in the region of the individual convexity 17 in the tube blank 16, receive from the crush moulding the shape of either a rough channel 21 that is open into the interior 3 of the pipe 1 or of the tube blank 16 and is closed on its end distanced from the pipe interior 3. The crush-moulding process is conducted if the tube blank 16 is in a state in which it is not yet solidified. For example, the crush-moulding process can immediately follow the blow-moulding process so that the tube blank 16 is still viscous. Likewise, the blow-moulding tool 14 can be correspondingly tempered in order to make the crush-moulding process possible. Furthermore, it is possible, in principle, to impinge pressure, preferably blow-moulding pressure, upon the pipe interior 3 during the crush-moulding process.

FIG. 9 depicts the crush moulding in the region of one of the channels 4 in order to illustrate the formation of a rough channel 21. The crush-moulding tool 19 crushes directly together the wall sections adjacent one another in the recess 20 between adjacent channels 4, that is to say in the region of the web 10, thus causing said wall sections to adhere together, owing to their viscous state, or to bond together chemically.

Subsequent to the crush-moulding process, a cutting process is carried out. Corresponding to FIG. 10, the apparatus 13 is equipped with a corresponding cutting tool 22 for this purpose, which has two components in the example, namely an abutment 22a and a blade 22b, which cutting tool 22 is moveable relative to the abutment 22a corresponding to an arrow 24. In cutting the tube blank 16, the blade 22b cuts off an end section 23 in the region of each rough channel 21, sealing the respective rough channel 21. In this manner, the channel 4 open on both sides results.

Subsequent to the cutting process, the pipe 1 is substantially complete.

The cutting process is carried out when the tube blank 16 is in a solidified state. In the example shown, the cutting tool 22 replaces the crush-moulding tool 19 so that the tube blank 16 can remain in the blow-moulding tool 14. It is evident that in a different embodiment, the cutting tool 22 can be integrated in the crush-moulding tool 19 or in the blow-moulding tool 14. Moreover, it is possible in a yet a different embodiment to provide an entirely separate cutting tool 22 in which the tube blank 16 is to be placed in order to carry out the cutting process. In the instance in which the cutting tool 22 is integrated in the crush-moulding tool 19 or in the blow-moulding tool 14, the cutting tool 22 is designed so as to be moveable between at least two positions. The cutting tool 22 is conveyed into a first position for the blow-moulding process or for the crush-moulding process, in which position said cutting tool 22 does not prevent the forming process in question. For the cutting process, the cutting tool 22 or its blade 22b is conveyed into the second position.

The invention claimed is:

1. A method for producing a pipe having walls, comprising:
providing at least one channel between ends of said wall, wherein said at least one channel passes through said wall,
blow moulding a tube blank composed at least in part of plastic in a blow-moulding tool, wherein the blow-moulding tool has a convexity for each of the at least one channel, wherein the convexity lines the tube blank and internal measurements of the convexity are greater than exterior measurements of each of the at least one channel,
crushing the tube blank in a not-yet-solidified state in a region of the convexity by a crush-moulding tool such that for each of the at least one channels a rough channel results that communicates with an interior of the pipe, wherein the rough channel is closed on an end distant from the pipe interior and has the exterior measurement of each of the at least one channel with the exception of a desired channel length, cutting the crushed tube blank in a solidified state in a region of each rough channel with a cutting tool in such a manner that subsequent thereto, each of the individual at least one channels are open and have the desired channel length, and impinging with pressure during the crush-moulding process, the pipe interior, wherein the pressure is a blow-moulding pressure.

2. The method as specified in claim 1, comprising integrating the crush-moulding tool in the blow-moulding tool such that the crush-moulding tool assumes a first position during blow moulding and is conveyed into a second position during crush moulding.

3. The method as specified in claim 1, comprising integrating the cutting tool in one of the blow-moulding tool and in the crush-moulding tool such that the cutting tool assumes a first position during at least one of blow moulding and crush moulding and is conveyed into a second position during cutting.

4. The method as specified in claim 1, wherein the step of crushing the tube blank comprises crushing two sides of the convexity toward one another.

5. The method as specified in claim 1, wherein the convexity extends radially to line the tube blank.

6. An apparatus for producing a pipe including walls between ends of which have at least one channel that passes through said wall, comprising:
    a blow-moulding tool in which a tube blank composed of plastic is blow moulded, wherein the blow-moulding tool has a convexity for each of the at least one channels, wherein the convexity is lined by the tube blank and has internal measurements greater that are than exterior measurements of each of the at least one channels,
    a crush-moulding tool with which the tube blank in a not-yet-solidified state is configured for being crushed in a region of the convexity such that for each of the at least one channels a rough channel results that communicates with an interior of the pipe, wherein the rough channel is closed on an end distant from the pipe interior and has the exterior measurement of the at least one channels included with the exception of a desired channel length, and
    a cutting tool with which the crushed tube blank in a solidified state is cut in a region of each rough channel such that subsequent thereto, the individual at least one channels are open and have the desired channel length;
    wherein the apparatus is configured to crush the tube blank following blow-moulding the tube blank.

7. The apparatus as specified in claim 6, the crush-moulding tool integrated in the blow-moulding tool such that the crush-moulding tool is conveyed into a first position for the blow-moulding process and is conveyed into a second position for the crush-moulding process.

8. The apparatus as specified in claims 6, the cutting tool integrated in one of the blow-moulding tool and in the crush-moulding tool such that the cutting tool is conveyed into a first position for the blow-moulding process and is conveyed into a second position for the cutting process.

9. The method as specified in claim 1, comprising integrating the crush-moulding tool in the blow-moulding tool such that the crush-moulding tool assumes a first position during blow moulding and is conveyed into a second position during crush moulding.

10. The method as specified in claim 1, comprising integrating the cutting tool in one of the blow-moulding tool and in the crush-moulding tool such that the cutting tool assumes a first position during at least one of blow moulding and crush moulding and is conveyed into a second position during cutting.

11. The apparatus as specified in claim 6, wherein the crush-moulding tool is configured to crush two sides of the convexity toward one another.

12. The apparatus as specified in claim 6, wherein the convexity extends radially to line the tube blank.

13. A method for producing a pipe having walls, comprising:
    providing at least one channel between ends of said wall, wherein said at least one channel passes through said wall,
    blow moulding a tube blank composed at least in part of plastic in a blow-moulding tool, wherein the blow-moulding tool has a convexity for each of the at least one channel, wherein the convexity lines the tube blank and internal measurements of the convexity are greater than exterior measurements of each of the at least one channel,
    crushing the tube blank in a not-yet-solidified state in a region of the convexity by a crush-moulding tool such that for each of the at least one channels a rough channel results that communicates with an interior of the pipe, wherein the rough channel is closed on an end distant from the pipe interior and has the exterior measurement of each of the at least one channel with the exception of a desired channel length,
    cutting the crushed tube blank in a solidified state in a region of each rough channel with a cutting tool in such a manner that subsequent thereto, each of the individual at least one channels are open and have the desired channel length;
    wherein the step of crushing follows the step of blow moulding.

* * * * *